United States Patent Office 3,585,055
Patented June 15, 1971

3,585,055
STRENGTHENED GLASS-CERAMIC ARTICLES AND METHOD OF PRODUCTION
George H. Beall, Corning, and Bruce R. Karstetter, Painted Post, N.Y., assignors to Corning Glass Works, Corning, N.Y.
No Drawing. Filed May 8, 1967, Ser. No. 636,602
Int. Cl. C03c *3/22*
U.S. Cl. 106—39
5 Claims

ABSTRACT OF THE DISCLOSURE

This invention relates to the strengthening of glass-ceramic articles through an ion exchange process wherein the strength is retained when the articles are used in service applications at high temperatures. More particularly, this invention relates to the strengthening of glass-ceramic articles containing stuffed beta-quartz as the principal crystal phase through the exchange of lithium ions for aluminum ions in the surface of such articles at a temperature of at least about 900° C.

---

A glass-ceramic article is formed through the carefully controlled heat treatment of a glass body. Thus, a glass-forming batch of the desired composition, to which a nucleating agent is commonly added, is melted and this melt cooled to a glass and an article of a desired configuration shaped therefrom. Thereafter, the glass article is subjected to a particular heat treating schedule such that nuclei are first developed in the glass which provide sites for the subsequent growth of crystals thereon. Glass-ceramic bodies are normally highly crystalline, i.e., the crystal phase comprises at least 50% of the body and, frequently, greater than 75% of the body, such that the properties thereof are generally more closely akin to the crystal phase than the residual glassy matrix. Reference is made to U.S. Pat. No. 2,920,971 for a more complete discussion of glass-ceramics and means for their production.

U.S. Pat. No. 3,252,811, granted to George H. Beall, one of the present applicants, discloses the production of certain transparent glass-ceramic materials wherein stuffed beta-quartz is the principal crystal phase. As was discussed therein, beta-quartz distinguishes a hexagonal trapezohedral form of silica that is stable between about 573°–870° C. and which is further characterized by a slightly negative coefficient of thermal expansion and a very low birefringence.

Buerger in his article, The Stuffed Derivatives of the Silica Structures, Am. Mineral., 39, 600–14 (1954), has shown that beta-quartz and the crystal known as beta-eucryptite ($Li_2O \cdot Al_2O_3 \cdot 2SiO_2$) form a complete series of solid solutions which he designated as "stuffed derivatives" of beta-quartz. Buerger assigned a crystal structure to these solid solutions wherein some of the tetrahedral silicon ions in the conventional beta-quartz were replaced by aluminum ions and the concomitant deficiency in ionic charge was satisfied by "stuffing" the interstitial vacancies in the double helicoid silica structure with lithium ions.

Schreyer and Schairer in their article, Metastable Solid Solutions With Quartz-Type Structures on the Join $SiO_2$—$MgAl_2O_4$, Geophys. Labor Paper No. 1357 (1961), demonstrated that other ions such as the magnesium ion may also be "stuffed" into the beta-quartz structure alone or in combination with lithium ions. Hence, the substitution of aluminum for silicon is accompanied by the stuffing of magnesium into the beta-quartz interstitial vacancies. In balancing the ionic charges, only one magnesium ion is required for the substitution of two silicon ions with two aluminum ions whereas two lithium ions are necessary in the beta-eucryptite case. This series of beta-quartz solid solution crystals stuffed with magnesium has been designated as the "mu-cordierite" series.

All of the compositions of our invention contain an excess of alumina over that required to compensate for the modifying oxides ($Li_2O$ and $MgO$). Some of the excess aluminum ions are believed to occupy modifying positions in the beta-quartz solid solution phase, while a certain amount may appear in the minor phases, mullite and glass. Regardless of its distribution among the phases, however, a certain portion of the aluminum must occur in network modifying positions, because there are not enough larger cations available to preserve electrical neutrality if all the aluminum ions are in network (tetrahedral) positions. In fact, exactly one-quarter of all the aluminum ions in excess of those required to compensate for the lithium and magnesium ions would be expected to be in such modifying positions, likely in octahedral or pseudo-octahedral co-ordination.

It is these octahedrally co-ordinated aluminum ions which are thought to be available for exchange with lithium ions from a salt bath. It is unlikely that tetrahedrally co-ordinated (network-forming) aluminum ions would be available for exchange at temperatures much below the melting region.

Further discussion of the positions which aluminum ions occupy in the structure of the beta-quartz solid solution phase is presented by Beall, Karstetter, and Rittler in their article Crystallization and Chemical Strengthening of Stuffed Beta-Quartz Glass-Ceramics, J. Am. Cer. Soc., 50, No. 4, April 1967.

The Beall patent cited above discloses glass-ceramic articles wherein the prinicpal crystal phase consists of beta-quartz solid solution stuffed with magnesium with or without accompanying lithium or zinc ions. These crystals were identified as stuffed beta-quartz in accordance with the mineral terminology set forth in the above literature citations.

The strengthening of glass articles through an ion exchange process is a relatively recent development which has had a considerable impact in the field of glass technology. Two principal types of exchange reactions have been described. U.S. Pat. No. 2,779,136 discloses the strengthening of sodium and/or potassium silicate glasses by contacting such glasses at some temperature above the strain point of the glass with a source of lithium ions (normally a bath containing a molten lithium salt) to cause a replacement of the sodium and/or potassium ions in a surface layer of the glass by lithium ions. Since the exchange is carried out at temperatures above the strain point of the glass, there is viscous flow therein which permits the attainment of a lithium-containing glass surface layer which has a lower coefficient of thermal expansion than the parent glass article. Therefore, when the glass article is cooled to room temperature following the ion exchange process, this lithium-containing glass surface forms a compression layer on the glass article which improves the mechanical strength of the article.

British Pat. No. 917,338 discloses the strengthening of alkali silicate glasses by contacting such glasses at some elevated temperature but below the strain point of the glass with a source of alkali ions having an ionic radius greater than that of the alkali ions in the parent glass (again, the source of ions is usually a bath containing a molten salt of the desired ion) to cause the replacement of the original alkali ion in a surface layer of the glass article by the larger alkali ions. Since the exchange is conducted at temperatures below the strain point of the glass, there is no viscous flow therein and the larger ions are, therefore, "crowded" into the sites previously occupied by the smaller parent alkali ions. The crowding results in a surface compression layer being developed on the article.

In both of these methods of strengthening, the exchange of ions appears to be diffusion controlled, i.e., dependent upon the rate of ion travel in the glass. Also, these methods utilize monovalent cations.

Pending application, Ser. No. 365,117, filed May 5, 1964 by R. O. Voss, now abandoned, discloses generally the strengthening of glass-ceramic articles through cation exchange in the crystal phase thereof and specifically describes the strengthening of a glass-ceramic article containing beta-spodumene solid solution as the primary crystal phase by replacing the lithium ion in the crystal with a larger alkali ion, thereby developing a compressive surface layer on the article through the "crowding" of the larger ion into the site occupied by the lithium. This ability to strengthen glass-ceramic articles through ion exchange in the crystal phase was quite unexpected since previous experiments to ion exchange crystalline ceramic articles, i.e., those articles produced through the sintering together of ceramic materials, resulted in essentially no strengthening and, frequently, led to the physical disintegration of the sintered body. Hence, it had been assumed that the highly crystalline glass-ceramic articles would behave similarly to the sintered articles and little strengthening, if any, would occur.

While that application deals specifically with the exchange of monovalent cations in the large-for-small type of ion exchange, pending application, Ser. No. 365,161, filed May 5, 1964 by the present applicants, now abandoned, discloses the strengthening of stuffed beta-quartz glass-ceramic articles containing magnesium ions with or without lithium and/or zinc ions whereby two lithium ions replace one magnesium ion within the crystal structure. In carrying out this exchange between divalent and monovalent ions, the glass-ceramic article was contacted with a source of exchangeable lithium ions (the examples therein utilizing a bath of molten lithium salt) at a temperature between 800°–850° C. to cause the replacement by lithium ions in a surface layer on the article of at least a portion of the magnesium ions which were stuffed into the beta-quartz phase.

While glass-ceramic articles have been produced which have very low coefficients of expansion and which exhibit mechanical strengths as high as 10,000–15,000 p.s.i., such as to render them suitable for culinary ware, for certain applications such as electric stove tops and burner plates for gas stoves, there has been a need for a glass-ceramic material having a low coefficient of thermal expansion coupled with a mechanical strength much greater than 15,000 p.s.i. so as to withstand the thermal shock and mechanical abuse to which such articles are subjected in service. Thus, the glass-ceramic should be able to withstand an upshock of about 50 watts/in.² with a relatively cold edge and downshock from 700°–800° C. to water at room temperature. The material should retain its strength for resistance to impacts through long periods of use at temperatures as high as 700°–900° C. Finally, the material should be resistant to food staining and surface etching at elevated temperatures and residual detergent films fired on during use.

We have discovered that a small group of high alumina glass compositions, after being crystallized in situ to fine-grained stuffed beta-quartz glass-ceramics followed by a straitly-defined ion exchange process, exhibits low coefficients of thermal expansion, excellent strength retention at high temperatures, and good chemical durability.

In general terms, our invention comprises forming a glass-ceramic body wherein beta-quartz solid solution stuffed with magnesium, lithium, and aluminum ions constitutes the predominant crystal phase, and then exposing this body to an external source of exchangeable lithium ions for a time and at a temperature to cause the replacement of at least part of the aluminum ions by lithium ions in the stuffed beta-quartz structure in a surface layer of the body. We have learned that temperatures between about 900°–1175° C. are required to effect this replacement.

The glass-ceramic articles of our invention are produced by melting batches for glasses consisting essentially, by weight on the oxide basis, of about 55–70% $SiO_2$, 23–35% $Al_2O_3$, 1–5% $MgO$, 1–3% $Li_2O$, and 3–7% $ZrO_2$, simultaneously cooling and shaping the melt into a glass body of the desired configuration, this cooling being to at least below the transformation range of the melt, i.e., the temperature at which a liquid melt is deemed to have become an amorphous solid, said temperature being generally in the vicinity of the annealing point of the glass which varies from about 675–800° C. for the glasses of this invention, thereafter heat treating said glass body by exposing it to a temperature of at least about 750° C., but not over about 1200° C., for a sufficient length of time to insure the desired nucleation and growth of crystallization, and, finally, cooling the crystallized body to room temperature.

Since the conversion of the glass body to a glass-ceramic body is time and temperature dependent, the heat treating process is quite flexible. Hence, at the cooler end of the operable treatment range relatively long exposures to such temperatures are required to assure a highly crystalline body, perhaps as long as 24 hours or even longer, whereas at the hotter end of the temperature range exposures of times as little as 15 minutes may be adequate. In the crystallization process, nuclei are first formed which provide sites for the growth of the crystal phase thereon. In general, then, the glass body is first heated to some temperature between about the annealing and softening points of the glass and held thereat for a period of time to cause good nucleation of the glass to occur. Subsequently, the glass article is heated above the softening point to result in the rapid growth of crystals on the nuclei. Where a glass-ceramic article is desired having very uniformly fine-grained crystals therein, one or more dwell periods in the nucleation temperature range may be utilized since more crystal sites will be produced for growth thereon, thus precluding the development of random large crystals. The crystal content of glass-ceramic articles is dependent upon the extent to which the batch ingredients are adaptable to the formation of crystal phases and the heat treatment given to the original glass articles. Our preferred practice contemplates maintaining the glass articles within the nucleation range (750°–850° C.) for about 2–10 hours and then raising the temperature to between 900°–1200° C. for about 2–8 hours.

Table I records glass compositions, expressed in weight percent on the oxide basis, wherein the batch ingredients, after being ballmilled together to obtain better glass homogeneity, were melted in open platinum cricibles at 1600°–1650° C. for about 16 hours. The melts were stirred for 30 minutes and allowed to fine for 30 minutes. Cane of about ¼" diameter was drawn by hand and the melts then poured in to steel molds and transferred to an annealer operating at 700° C. These glass bodies were cooled to room temperature to permit visual examination of the quality thereof. The glass canes and shapes were then placed in a kiln and heat treated in accordance with the schedules set out in Table II. Thus, the glass bodies were heated at about 5° C./minute to the first level of nucleation, held thereat for the cited time, the temperature optionally raised at 5° C./minute to a second level of nucleation, maintained thereat for the recorded time, and the temperature then raised to the crystallization temperature and held thereat for the cited time. The glass-ceramic bodies were cooled to room temperature by removing them from the furnace to cool in the air.

It will be understood that the heating rate appliied to the glass bodies is delimited by the thermal shock resistance in herent to the glass, the size and configuration of the glass article, and the rate at which crystallization developes within the glass during heat treatment. The glasses of this invention have relatively low coefficients of thermal expansion and when formed in shapes of small cross-section can be heated at rates much faster than 5° C./minute without hazarding cracking or breakage. However, when the glass article is heated above the transformation range, softening and consequent deformation of the article can occur. But, the deformation point of the glass-ceramic body is considerably higher than that of the original glass. Therefore, where the rate of heating the glass body above the transformation range is balanced against the rate at which crystals are formed, a crystalline structure will be produced which supports the body against deformation. Since crystallization proceeds more rapidly as the glass body approaches the solidus temperature (that temperature at which first melting occurs for stable crystalline aggregates of the same bulk composition as the glass), in commercial practice the glass articles are heat treated at temperatures much higher than that at which crystallization first occurs. Nevertheless, although more rapid heating rates can be employed, especially where very long holding periods at the lower end of the heating range are utilized, we prefer to increase the temperature at rates not exceeding about 5° C./minute in order to insure uniformly fine-grained crystallization wtih substantially no deformation of the body when heated above the softening point of the glass. More rapid heating rates are also practical where some physical support, such as various forms of kiln furniture, is provided for the body.

Since the coefficients of thermal expansion of the glass-ceramic articles are quite low, the rate of cooling the crystallized article to room temperature after heat treatment is virtualy unlimited. Hence, the articles can be removed directly from the furnace and allowed to cool in air.

The temperature at which the ion-exchange strengthening is carried out is a critical factor in our invention. We have determined that temperatures of at least 900° C., but not higher than about 1175° C., are required to cause the replacement of aluminum ions in the beta-quartz structure with lithium ions. That this exchange occurs in the surface layer of the glass-ceramic article has been indicated through X-ray diffraction and chemical analyses of the surface layer. Thus, the molar concentration of aluminum ions in this surface layer relative to the molar concentrations of other modifying ions is less than that in the core or interior portion of the body. These substitutions of lithium ions for aluminum and magnesium ions give rise to the surface compressive stress layer which is balanced by the interior parent portion being in tension.

Table I records glass compositions, expressed on the oxide basis, exclusive of minor impurities which may be present in the batch materials, operable in our invention. The batch ingredients may consist of any materials, either oxides or other compounds, which, on being melted together provide the desired oxide compositions in the proper proportions. Although these melts are of low viscosity, a fining agent such as $As_2O_5$ may be added in accordance with conventional glass making practice. However, since the amount remaining in the glass after the batch has been melted is so small that no substantial effect on the fundamental properties thereof results therefrom, this constituent is not included in Table I.

The amount of $SiO_2$, $Al_2O_3$, MgO, $Li_2O$, and $ZrO_2$ are critical in obtaining glass-ceramic articles which can be strengthened through ion exchange according to the method of this invention and this strentgh retained at high service temperatures. Various compatible metal oxides and fluoride can be added to the batch to aid in melting and forming the glass. However, these additions are preferably held to less than 5% by weight total. Such compatible metal oxides include $P_2O_5$, ZnO, $B_2O_3$, CaO, $Na_2O$, and $K_2O$. The total amount of $Na_2O$ and $K_2O$ should preferably not exceed about 3% by weight or the strength retention at high temperatures will be deleteriously affected.

TABLE I

| Example | Percent | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| $SiO_2$ | 60.7 | 61.3 | 56.6 | 60.4 | 59.8 | 60.4 | 61.3 | 61.3 | 61.8 | 62.8 | 63.8 | 64.8 | 6.63 | 60.2 |
| $Al_2O_3$ | 28.5 | 28.8 | 33.0 | 28.8 | 29.0 | 28.8 | 27.8 | 28.1 | 26.9 | 26.7 | 25.7 | 24.7 | 24.0 | 27.8 |
| MgO | 2.8 | 2.8 | 2.8 | 2.8 | 3.3 | 3.3 | 3.3 | 2.8 | 3.3 | 3.8 | 3.8 | 3.8 | 3.9 | 1.4 |
| $Li_2O$ | 1.5 | 1.5 | 2.0 | 2.4 | 1.9 | 1.9 | 2.0 | 2.2 | 2.4 | 1.9 | 1.9 | 1.9 | 2.0 | 2.1 |
| $ZrO_2$ | 6.5 | 5.6 | 5.6 | 5.6 | 5.6 | 5.6 | 5.6 | 5.6 | 5.6 | 4.8 | 4.8 | 4.8 | 3.8 | 5.7 |
| $P_2O_5$ | | | | | | | | | | | | | | 2.8 |

Table II records the heat treating schedules, the crystal phases present as determined by X-ray diffraction analyses, and some measurements of coefficients of thermal expansion between 0°–300° C. ($\times 10^{-7}$/° C.). These expansion determinations were obtained in the conventional manner. Beta-quartz solid solution constituted the great majority of crystals present although very minor amounts of the other recorded crystals were observed.

TABLE II

| Example No. | Heat treatment schedule | Crystal phases | Expansion |
|---|---|---|---|
| 1 | 780° C., 4 hours<br>830° C., 4 hours<br>930° C., 4 hours | Beta-quartz, tetragonal $ZrO_2$ | 30.7 |
| 1 | 780° C., 4 hours<br>830° C., 4 hours<br>1,100° C., 4 hours | Beta-quartz, mullite, tetragonal $ZrO_2$, cristobalite. | 28.4 |
| 1 | 780° C., 4 hours<br>830° C., 4 hours<br>1,150° C., 4 hours | ___do___ | 28.0 |
| 2 | 780° C., 4 hours<br>830° C., 4 hours<br>1,050° C., 4 hours | Beta-quartz, tetragonal $ZrO_2$, mullite | |

TABLE II—Continued

| Example No. | Heat treatment schedule | Crystal phases | Expansion |
|---|---|---|---|
| 3 | 800° C., 4 hours / 1,100° C., 4 hours | Beta-quartz, mullite, tetragonal ZrO₂ | |
| 4 | 800° C., 4 hours / 1,145° C., 4 hours | Beta-quartz, mullite, tetragonal ZrO₂, beta-spodumene solid solution | 21.2 |
| 5 | 825° C., 4 hours / 1,150° C., 4 hours | ___do___ | 23.3 |
| 6 | 825° C., 4 hours / 1,150° C., 4 hours | ___do___ | 23.2 |
| 7 | 825° C., 4 hours / 1,150° C., 4 hours | Beta-quartz, mullite, tetragonal ZrO₂ | 22.8 |
| 8 | 830° C., 4 hours / 1,150° C., 4 hours | ___do___ | 21.2 |
| 9 | 830° C., 4 hours / 1,150° C., 4 hours | Beta-quartz, mullite, tetragonal ZrO₂, beta-spodumene solid solution | 19.5 |
| 10 | 810° C., 4 hours / 1,130° C., 4 hours | Beta-quartz, mullite, tetragonal ZrO₂ | 22.2 |
| 11 | 825° C., 4 hours / 1,140° C., 4 hours | ___do___ | 22.2 |
| 12 | 830° C., 4 hours / 1,170° C., 4 hours | ___do___ | 20.3 |
| 13 | 830° C., 4 hours / 1,170° C., 4 hours | ___do___ | |
| 14 | 825° C., 4 hours / 1,150° C., 4 hours | ___do___ | 21.7 |

Table III records the results of ion-exchange strengthening. In each instance, a bath of molten $Li_2SO_4$ was employed as the exchange medium. However, other lithia salts which are molten but do not decompose at the required elevated temperatures can be utilized, as can mixtures of lithia salts with other high melting salts. Modulus of rupture measurements, conducted in the conventional manner upon ¼" diameter cane samples which had been abraded, demonstrate a two-to-four fold improvement in mechanical strength over that of the original abraded glass-ceramic cane samples which range from about 10,000–15,000 p.s.i. The strength of a glass-ceramic body is influenced to some degree by scratches, pits, and other flaws which may be present in the surface thereof. In actual service, the surface of a glass-ceramic article can be damaged through impact or rubbing against other articles. Therefore, the service or practical strength of a glass-ceramic body is related to the strength exhibited thereby after the surface thereof has been flawed. Accordingly, standard abrasion tests have been devised for simulating known types of service conditions. One test which is believed to reasonably simulate flaws resulting from a combination of rubbing abrasion and actual impact is referred to as tumble abrasion. In this test, ten glass cane or rods about 4" by ¼" diameter are placed in a Number 0 ballmill jar, 200 cc. of 30 grit SiC particles added thereto, and the ballmill jar rotated for 15 minutes at 90–100 r.p.m. This is the type abrasion to which the cane samples of these examples were subjected prior to being tested for modulus of rupture. In general, an exchange time of at least one hour is necessary to effect a surface layer of sufficient depth to withstand the abrasion experienced by articles in normal service such that the improvement in strength imparted to the article will be retained under service conditions. Much longer times, e.g., 24 hours and even longer, are useful but may not be commercially economical. This depth of surface layer is preferably at least 5 microns.

In carrying out the ion exchange treatment, the glass-ceramic articles were preheated to about 900° C. and then immersed into the $Li_2SO_4$ bath operating at the cited temperatures and maintained therein for the specified periods of time. The articles were then removed from the bath, allowed to cool in air, and the clinging salt washed away with water.

EXAMPLE III

| Example No. | Glass-ceramic heat treatment | Ion exchange treatment | Modulus of rupture, p.s.i. |
|---|---|---|---|
| 1 | 780° C., 4 hours / 830° C., 4 hours / 930° C., 4 hours | 850° C., 4 hours | 12,000 |
| 1 | 780° C., 4 hours / 830° C., 4 hours / 930° C., 4 hours | 1,050° C., 4 hours | 37,000 |
| 1 | 780° C., 4 hours / 830° C., 4 hours / 930° C., 4 hours | 1,050° C., 8 hours | 48,000 |
| 1 | 780° C., 4 hours / 830° C., 4 hours / 940° C., 4 hours | 1,050° C., 24 hours | 57,000 |
| 1 | 780° C., 4 hours / 830° C., 4 hours / 1,150° C., 4 hours | 950° C., 24 hours | 46,000 |
| 1 | 780° C., 4 hours / 830° C., 4 hours / 1,150° C., 4 hours | 1,150° C., 24 hours | 22,000 |
| 2 | 789° C., 4 hours / 830° C., 4 hours / 1,050° C., 4 hours | 1,050° C., 24 hours / 1,050° C., 24 hours | 64,000 / 64,000 |
| 3 | 925° C., 4 hours / 1,150° C., 4 hours | 1,045° C., 24 hours | 62,000 |
| 5 | 825° C., 4 hours / 1,150° C., 4 hours | 1,048° C., 24 hours | 40,000 |
| 6 | 825° C., 4 hours / 1,150° C., 4 hours | 1,050° C., 24 hours | 45,000 |
| 7 | 825° C., 4 hours / 1,150° C., 4 hours | ___do___ | 40,000 |
| 11 | 825° C., 4 hours / 1,140° C., 4 hours | ___do___ | 54,000 |
| 12 | 825° C., 4 hours / 1,150° C., 4 hours | ___do___ | 36,000 |
| 13 | 825° C., 4 hours / 1,150° C., 4 hours | 1,047° C., 24 hours | 39,000 |
| 14 | 825° C., 4 hours / 1,150° C., 4 hours | 950° C., 24 hours | 48,600 |
| 14 | 825° C., 4 hours / 1,150° C., 4 hours | 1,050° C., 24 hours | 50,400 |

This table clearly demonstrates the great effect which the ion exchange process of the instant invention has upon the strength of glass-ceramic articles crystallized in situ from the specified glasses. The table, with Example 1, also illustrates the criticality of the exchange temperatures since at 850° C. little effect is felt whereas at 1150° C. the maximum in strength has been exceeded.

Table IV records the ability of the products of this invention to retain high strength even after long periods of reheating at high temperatures. The ion exchange was carried out in similar fashion to that described in Table III again utilizing a bath of molten $Li_2SO_4$.

TABLE IV

| Example No. | Glass-ceramic heat treatment | Ion exchange treatment | Reheat in air | Modulus of rupture, p.s.i. |
|---|---|---|---|---|
| 1 | 780° C., 4 hours / 820° C., 4 hours / 925° C., 4 hours | 1,050° C., 24 hours | None | 47,000 |
| 1 | 780° C., 4 hours / 820° C., 4 hours / 925° C., 4 hours | ----do---- | 900° C., 1 hour | 44,000 |
| 1 | 780° C., 4 hours / 820° C., 4 hours / 925° C., 4 hours | ----do---- | 900° C., 10 hours | 45,000 |
| 1 | 780° C., 4 hours / 820° C., 4 hours / 925° C., 4 hours | ----do---- | 900° C., 99 hours | 34,000 |
| 1 | 780° C., 4 hours / 820° C., 4 hours / 925° C., 4 hours | ----do---- | 1,000° C., 1 hour | 46,000 |
| 1 | 780° C., 4 hours / 820° C., 4 hours / 925° C., 4 hours | ----do---- | 1,000° C., 10 hours | 38,000 |
| 1 | 780° C., 4 hours / 820° C., 4 hours / 925° C., 4 hours | ----do---- | 1,000° C., 99 hours | 18,000 |
| 1 | 780° C., 4 hours / 835° C., 4 hours / 1,075° C., 4 hours | 1,050° C., 43 hours | None | 49,000 |
| 1 | 780° C., 4 hours / 835° C., 4 hours / 1,075° C., 4 hours | ----do---- | 800° C., 99 hours | 48,000 |
| 1 | 780° C., 4 hours / 835° C., 4 hours / 1,075° C., 4 hours | ----do---- | 850° C., 99 hours | 44,000 |
| 1 | 780° C., 4 hours / 835° C., 4 hours / 1,075° C., 4 hours | ----do---- | 930° C., 99 hours | 30,000 |
| 7 | 825° C., 4 hours / 1,150° C., 4 hours | 1,048° C., 24 hours | None | 48,000 |
| 7 | 825° C., 4 hours / 1,150° C., 4 hours | ----do---- | 850° C., 100 hours | 29,000 |
| 7 | 825° C., 4 hours / 1,150° C., 4 hours | ----do---- | 900° C., 100 hours | 22,000 |
| 11 | 825° C., 4 hours / 1,140° C., 4 hours | 1,053° C., 24 hours | None | 54,000 |
| 11 | 825° C., 4 hours / 1,140° C., 4 hours | ----do---- | 810° C., 100 hours | 49,000 |
| 11 | 825° C., 4 hours / 1,140° C., 4 hours | ----do---- | 820° C., 100 hours | 46,000 |
| 11 | 825° C., 4 hours / 1,140° C., 4 hours | ----do---- | 850° C., 100 hours | 40,000 |
| 11 | 825° C., 4 hours / 1,140° C., 4 hours | ----do---- | 900° C., 100 hours | 26,000 |

The modulus of rupture measurements, determined in the conventional manner on abraded cane samples, fully demonstrate the retention of strength possessed by the products of the present invention after long periods of reheating at high temperatures. Thus, there is essentially no loss of strength at 700° C. and deterioration in strength does not become serious until temperatures of 750°–1000° C. are reached and maintained for long periods of time. Hence, these products exhibit such good thermal stability as to make them useful for high strength applications up to about 850° C.

Example 11 is our preferred composition from the practical points of view of meltability, formability, and the development of strength.

We claim:

1. A unitary glass-ceramic article of high strength having a crystal content of a least 50% by weight of the article with an integral surface compressive stress layer and an interior portion consisting essentially, by weight on the oxide basis, of about 55–70% $SiO_2$, 23–35% $Al_2O_3$, 1–5% MgO, 1–3% $Li_2O$, and 3–7% $ZrO_2$, wherein the crystals of said interior portion consist essentially of beta-quartz stuffed with lithium, aluminum, and magnesium ions and the crystals of said surface compressive stress layer consist essentially of beta-quartz stuffed with lithium, aluminum, and magnesium ions but in at least a portion of which the molar concentration of aluminum ions is less with a corresponding increase in the molar concentration of lithium ions.

2. A unitary glass-ceramic article according to claim 1 wherein said compressively stressed surface layer is at least 5 microns in depth.

3. A method for making a unitary glass-ceramic article of high strength having a crystal content of at least 50% by weight of the article with an integral surface compressive stress layer and an interior portion which comprises contacting a glass-ceramic article consisting essentially, by weight on the oxide basis, of about 55–70% $SiO_2$, 23–35% $Al_2O_3$, 1–5% MgO, 1–3% $Li_2O$, and 3–7% $ZrO_2$ wherein the crystal phase therein consists essentially of beta-quartz stuffed with lithium, aluminum, and magnesium ions at a temperature between about 900°–1175° C. with a source of exchangeable lithium ions for a period of time sufficient to replace at least part of the aluminum ions of said beta-quartz in a surface layer of the article with lithium ions on three lithium ion-for-one-aluminum ion basis, said replacement thereby effecting an integral compressively stressed surface layer on the article.

4. A method according to claim 3 wherein said time sufficient to replace at least part of the aluminum ions of the beta-quartz solid solution in the surface layer with lithium ions ranges between about 1–24 hours.

5. A method according to claim 3 wherein said compressively stressed surface layer is at least 5 microns in depth.

References Cited

UNITED STATES PATENTS

| | | | |
|---|---|---|---|
| 2,779,136 | 1/1957 | Hood et al. | 65—30X |
| 3,218,220 | 11/1965 | Weber | 65—30X |
| 3,252,811 | 2/1966 | Beall | 65—33X |
| 3,282,770 | 11/1966 | Stookey et al. | 65—30X |
| 3,482,513 | 2/1969 | Denman | 65—33X |

OTHER REFERENCES

Kistler, S. S.: "Stresses in Glass Produced by Non-Uniform Exchange of Monovalent Ions," J. F. Am. Cer. Soc., vol. 45, No. 2, pp. 59–68, February 1962.

S. LEON BASHORE, Primary Examiner

J. H. HARMAN, Assistant Examiner

U.S. Cl. X.R.

65—30, 33